(12) United States Patent
Koga et al.

(10) Patent No.: US 7,674,329 B2
(45) Date of Patent: Mar. 9, 2010

(54) WATER-BASED INK SET FOR INK-JET RECORDING

(75) Inventors: Narumi Koga, Nagoya (JP); Masaya Fujioka, Nagoya (JP); Kazuma Goto, Nagoya (JP); Shunichi Higashiyama, Yokkaichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 459 days.

(21) Appl. No.: 11/675,477

(22) Filed: Feb. 15, 2007

(65) Prior Publication Data

US 2007/0186812 A1    Aug. 16, 2007

(30) Foreign Application Priority Data

Feb. 16, 2006   (JP)   ............... 2006-038768

(51) Int. Cl.
*C09D 11/02*   (2006.01)

(52) U.S. Cl. .............. 106/31.59; 106/31.58; 106/31.86; 106/31.89

(58) Field of Classification Search ............. 106/31.58, 106/31.86, 31.59, 31.89
See application file for complete search history.

(56) References Cited

U.S. PATENT DOCUMENTS

| 7,244,296 B2 * | 7/2007 | Kato et al. ............... 106/31.27 |
| 2006/0082630 A1 * | 4/2006 | Kato et al. .................. 347/100 |

FOREIGN PATENT DOCUMENTS

JP    H55-065269 A    5/1980

* cited by examiner

*Primary Examiner*—Jerry Lorengo
*Assistant Examiner*—Veronica Faison Gee
(74) *Attorney, Agent, or Firm*—Baker Botts L.L.P.

(57) ABSTRACT

According embodiments of the present disclosure, a water-based ink set for ink-jet recording is provided. The ink set may contain a black ink, a cyan ink, a magenta ink and a yellow ink. Each ink may contain a polyoxyethylene alkyl ether sulfonate.

20 Claims, No Drawings

WATER-BASED INK SET FOR INK-JET RECORDING

This application claims the benefit of Japanese Patent Application No. 2006-38768, filed Feb. 16, 2006, which is incorporated herein by reference.

BACKGROUND OF THE INVENTION

1. Field of the Invention

Embodiments of the present invention relate to a water-based ink set for ink-jet recording containing a black ink (hereinafter, referred to also as "Bk ink"), a yellow ink (hereinafter, referred to also as "Y ink"), a magenta ink (hereinafter, referred to also as "M ink") and a cyan ink (hereinafter, referred to also as "C ink").

2. Description of the Related Art

In an ink-jet recording system, ink droplets are formed by using any one of several ink discharging methods including, for example, an electrostatic attraction method, a method in which mechanical vibration or displacement is applied to an ink by using a piezoelectric element, and a method in which bubbles are generated by heating the ink. Then, a part or all of the thus-formed ink droplets are allowed to adhere to a recording material such as paper to effect the recording.

Such ink-jet recording methods typically use an ink set, containing a Y ink, an M ink, a C ink and a Bk ink. Each of these inks typically includes a pigment or a dye dissolved or dispersed in a liquid medium containing water and a water-soluble organic solvent.

Individual inks constituting the ink set typically have the following properties for optimal ink-jet recording:

1) recovery performance upon ink introduction into an ink-jet head after previous ejection failure from a nozzle is excellent;

2) when an image is formed on recording paper, particularly using the Bk ink, high printing quality is obtained; this high quality image has a sharp outline or contour of the image without causing any irregular flow of the ink along a fiber of the recording paper or irregular penetration (hereinafter, referred to also as "blurring") of the ink into a space between fibers of the recording paper;

3) when an image is formed on recording paper, particularly using the Bk ink, ink drying on a surface of paper is excellent;

4) when an image is formed on recording paper, although inks having different colors become blended with each other at their boundaries with one another, (hereinafter, such blending phenomenon being referred to as "bleeding"), the bleeding occurs only to a small extent; and 5) when an image is formed on recording paper, color unevenness does not occur, or occurs only to small extent in a color printing region.

In order to achieve these properties, a penetrant, such as a surfactant and the like, that enhances a penetrability is often added to the ink. The drying of each ink on the surface of paper is also typically improved. Blurring, however, particularly of the Bk ink, is conspicuous in such inks. On the other hand, when the penetrability of each ink is reduced, there is a tendency for the bleeding, including bleeding between the Bk ink and other ink colors and also between the Y ink and the M ink or between the Y ink and the C ink, is aggravated. In order to improve this bleeding problem, the amount of added surfactant or penetrant may be adjusted, but then not are there problems with Bk ink blurring and drying on the surface of paper, but also the color unevenness in the color printing region tends to be aggravated.

Accordingly, it is difficult to obtain satisfactory recovery performance upon ink introduction into the ink-jet head only by adjusting the penetrability of the ink into the recording material. As described above, there is no ink set for ink-jet recording in related art which simultaneously satisfactorily solves the problems of the recovery performance upon ink introduction into the ink-jet head, the blurring of the Bk ink, Bk ink drying on the surface of paper, the bleeding between the different inks, and color unevenness in the color printing region.

SUMMARY OF THE INVENTION

Embodiments of the present invention provide a water-based ink set for ink-jet recording which simultaneously has addresses the problems of: recovery performance upon ink introduction into the ink-jet head, blurring of the Bk ink, Bk ink drying on the surface of paper, bleeding between the different inks, and color unevenness in the color printing region.

In one embodiment, a polyoxyethylene alkyl ether sulfonate having a specific chemical structure may be used in all inks. This improves not only the recovery performance upon ink introduction into the ink-jet head, but also penetrabilities of inks near to one another, thereby improving the problems of bleeding.

In another embodiment, dipropylene glycol propyl ether may be blended into the Bk ink. As a result, blurring and drying on the surface of paper of the Bk ink may simultaneously be improved. In a further embodiment, by blending triethylene glycol butyl ether into color inks, the color unevenness in the color printing region may also be improved.

In still another embodiment, blurring of the Bk ink may be improved if the Bk ink has a dynamic surface tension of about 35 mN/m or more at a lifetime of 1000 ms. In a further embodiment, it is effective to improve the Bk ink drying on the surface of paper if this ink has a dynamic surface tension of about 45 mN/m or less at a lifetime of 30 ms.

In another embodiment, the degree of penetration of any two inks having different colors into the recording paper may be made more uniform if the absolute value of the difference between dynamic surface tensions of each combination of inks is about 5 mN/m or less at the lifetimes of 30 ms and 1000 ms. In a further embodiment, any bleeding between the different inks which can not be suppressed by merely adding dipropylene glycol propyl ether or triethylene glycol butyl ether may also be improved in inks with no more than the prescribed difference in dynamic surface tensions.

According to a specific embodiment of the present invention, a water-based ink set may contain a Bk ink, a Y ink, an M ink and a C ink. Each of the Bk ink, the Y ink, the M ink and the C ink may contains a polyoxyethylene alkyl ether sulfonate represented by the following general formula (I):

$$R-O-(CH_2CH_2O)_n-SO_3M \qquad (I),$$

wherein R represents $C_xH_{2x+1}$ in which x represents a number from 11 to 15;

M represents Na, $NH_4$ or $NH(CH_2CH_2OH)_3$; and n represents a number from 2 to 4.

According to a specific embodiment, the Bk ink may contain dipropylene glycol propyl ether. Each of the Y ink, the M ink and the C ink may contain triethylene glycol butyl ether.

According to another embodiment, a dynamic surface tension of the Bk ink as measured by a maximum bubble pressure method at a measurement temperature of 25° C. may be about 35 mN/m or more at a lifetime of 1000 ms and about 45 mN/m or less at a lifetime of 30 ms. An absolute value of a difference between dynamic surface tensions of each combination of inks selected from the Bk ink, the Y ink, the M ink and the C ink may be about 5 mN/m or less at the lifetimes of 30 ms and 1000 ms.

Other objects, features, and advantages will be apparent to those skilled in the art from the following detailed description.

DETAILED DESCRIPTION OF THE PREFERRED EMBODIMENTS

According to one embodiment, the invention includes a water-based ink set containing a Bk ink, a Y ink, an M ink and a C ink. Each of the Bk ink, the Y ink, the M ink, and the C ink may contain a polyoxyethylene alkyl ether sulfonate represented by the following general formula (I):

$$R-O-(CH_2CH_2O)_n-SO_3M \qquad (I),$$

wherein R represents $C_xH_{2x+1}$ in which x represents a number from 11 to 15;

M represents Na, $NH_4$ or $NH(CH_2CH_2OH)_3$; and n represents a number from 2 to 4.

This compound exhibits excellent wetting of metal material, particularly nickel or a 42 alloy (nickel-iron alloy containing 42% of nickel), which are often used in an ink-jet head. This wetting improves the recovery performance of each of the inks in the ink set, when the ink set is used in an ink-jet head. Further, by using a same compound for each of the inks, penetrability of these inks may be made more uniform and, as a result, bleeding between different inks may be suppressed.

If too little polyoxyethylene alkyl ether sulfonate represented by the general formula (I) is provided in each ink, a sufficient recovery performance may not be obtained. On the other hand, when the amount of the polyoxyethylene alkyl sulfonate in each ink is unduly large, bleeding is increased. Accordingly, in a specific embodiment, the amount of the polyoxyethylene alkyl sulfonate represented by the general formula (I), as an active ingredient amount, in the each ink may be about 0.01 wt % to about 1 wt %, more specifically about 0.02 wt % to about 0.7 wt %, of the overall weight of each ink.

In a further embodiment, in each ink, in order to enhance the penetrability of each ink into the recording paper, any other surfactant may simultaneously be used along with the polyoxyethylene alkyl ether sulfonate represented by the general formula (I). The other surfactants which may simultaneously be used include, but are limited to, anionic surfactants such as aliphatic acid salts, alkyl sulfuric acid ester salts and the like; nonionic surfactants such as polyoxyethylene alkyl ether, polyoxyethylene phenyl ether and the like; acetylene glycol type nonionic surfactants such as OLFINE® E1004 and E1010 (products from Nissin Chemical Industry Co., Ltd.), SURFYNOL® 61, 82, 104, 440, 465 and 485 (products from Air Products and Chemicals, Inc.) and the like; cationic surfactants; amphoteric ionic surfactants; and the like.

In a specific embodiment, each of the inks may contain a coloring agent and a penetrant. The term "penetrant" used herein means an agent which decreases the dynamic surface tension of each ink and appropriately increases the ink penetrating speed into a recording paper. Therefore, bleeding or the color unevenness may be alleviated by the penetrant, and drying on the recording paper of the ink may be improved.

In a water-based ink for ink-jet recording, ordinarily, a penetrant is selected to appropriately increase the penetrating speed of the ink into the recording paper while producing little blurring along with penetration. Accordingly, in some embodiments of the invention, dipropylene glycol propyl ether is used in the Bk ink and triethylene glycol butyl ether is used in each of the Y ink, the M ink and the C ink. When dipropylene glycol propyl ether is used in the Bk ink, dipropylene glycol propyl ether has a strongly enhances the penetrability of the Bk ink into the recording paper, suppressed decreases blurring of the Bk ink, and also improves Bk ink drying on the surface of paper. The blurring and drying improvement may be seen with only a small amount of dipropylene glycol propyl ether. Triethylene glycol butyl ether may be used in each of the Y ink, the M ink and the C ink to uniformly enhance the penetrability of the ink into the recording paper and to improve color unevenness.

When too little dipropylene glycol propyl ether is used in the Bk ink, sufficient drying may not be obtained, while, when the amount thereof in the Bk ink is too large, bleeding and blurring of the Bk ink may be result. Therefore, in specific embodiments the amount of dipropylene glycol propyl ether in the Bk ink may be about 0.1 wt % to about 3 wt %, more specifically about 0.2 wt % about to 2 wt %, of the overall weight of the Bk ink. When the amount of triethylene glycol butyl ether in each of the Y ink, the M ink and the C ink is too small, color unevenness may be result, while, when the amount thereof in each of inks is too large, bleeding may result. Therefore, the amount of tryethylene glycol butyl ether in each of the color inks may be about 0.5 wt % to about 10 wt %, more specifically about 1 wt % to about 5 wt %, of the overall weight of each ink.

In the Bk ink, in order to further improve the penetrability of each ink, any other polyhydric alcohol alkyl ether having a low odor and low vapor pressure may simultaneously be used along with dipropylene glycol propyl ether. The polyhydric alcohol alkyl ether may include, but is not limited to, diethylene glycol methyl ether, diethylene glycol butyl ether, diethylene glycol isobutyl ether, dipropylene glycol methyl ether, dipropylene glycol isopropyl ether, dipropylene glycol butyl ether, triethylene glycol methyl ether, triethylene glycol butyl ether, tripropylene glycol methyl ether, tripropylene glycol butyl ether and the like.

Also in each of the Y ink, the M ink and the C ink, in order to further improve the penetrability of each ink, any other polyhydric alcohol alkyl ether having a low odor and low vapor pressure may simultaneously be used along with triethylene glycol butyl ether. The polyhydric alcohol alkyl ether may include, but are not limited to, diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, tripropylene glycol methyl ether, tripropylene glycol butyl ether and the like.

In the water-based ink set according to the invention, the dynamic surface tension measured by the maximum bubble pressure method at a measurement temperature of 25° C. may satisfy the following conditions:

(1) in the Bk ink, the dynamic surface tension may be about 35 mN/m or more at a lifetime of 1000 ms and about 45 mN/m or less at a lifetime of 30 ms; and (2) an absolute value of a difference between dynamic surface tensions each combination of inks selected from the Bk ink, the Y ink, the M ink and the C ink may be about 5 mN/m or less at the lifetimes of 30 ms and 1000 ms.

The value of the dynamic surface tension is the value measured by the maximum bubble pressure method and is appropriate for measuring the surface tension during a relatively short lifetime of ink discharge. Ordinarily, the dynamic surface tension is measured by a vibration jet method, a meniscus method, the maximum bubble pressure method or the like. During measurement by the maximum bubble pressure method, a gas is transferred from a gas supply source to a probe. Then, a bubble is generated from a tip end of the probe which is dipped in an ink. Subsequently, the bubble generating speed is changed by changing a gas flow volume and, along with this change, pressure placed on the bubble from the ink is changed. The surface tension is measured by the changed pressure. When the radius of the bubble becomes equal to the radius of a tip end portion of the probe, the maximum pressure (maximum bubble pressure) is reached. The dynamic surface tension σ of the ink at this time is represented by the following formula:

σ=(ΔP·r)/2 wherein r represents a radius of the tip end portion of the probe;

ΔP represents a difference between a maximum value and a minimum value of pressure placed on a bubble and, on this occasion, the maximum value thereof is the maximum pressure (maximum bubble pressure) at the time a curvature radius of the bubble becomes equal to the radius of the tip end portion of the probe.

The term "lifetime" used herein means a time period from the time when the bubble is separated from the probe after the maximum bubble pressure and a new surface is formed to the time of the next maximum bubble pressure.

In ink-jet recording, the dynamic surface tension at a lifetime of 30 ms is related to a behavior of the ink in which, immediately after the ink adheres to the recording paper, it penetrates into the recording paper in the thickness direction (as opposed to spreading out over the surface of the paper). When the dynamic surface tension at a lifetime of 30 ms is high, it becomes hard for the ink to penetrate into the recording paper and then drying on the surface of paper decreases. Further, the dynamic surface tension at a lifetime of 1000 ms is related to another ink behavior in which ink, after penetrating into the paper, then spreads out on the surface of the paper, causing blurring. When the dynamic surface tension at a lifetime to 1000 ms is low, ink spreads too readily on the surface of the paper and then blurring occurs.

According to an embodiment of the invention, blurring of the Bk ink may be improved when the dynamic surface tension of the Bk ink as measured by a maximum bubble pressure method at a measurement temperature of 25° C. is about 35 mN/m or more at a lifetime of 1000 ms. The Bk ink drying on the surface of paper may be improved when the dynamic surface tension of the Bk ink as measured by a maximum bubble pressure method at a measurement temperature of 25° C. is about 45 mN/m or less at a lifetime of 30 ms.

Further, when the absolute value of a difference between the dynamic surface tensions of each ink in the ink set is about 5 mN/m or less at the lifetimes of 30 ms and 1000 ms, and particularly about 5 mN/m or less at any lifetime between 30 ms and 1000 ms, penetration of ink in the thickness direction may be uniform, which suppresses bleeding between the inks. When the difference in dynamic surface tension between two inks is over about 5 mN/m, the ink having a higher dynamic surface tension and lower intensity of penetration into the recording paper is attracted into a recorded portion of the ink having a lower dynamic surface tension and a higher intensity of the penetration into the recording paper. This results in color mixing of the inks in the recorded portion of the ink having the lower dynamic surface tension and the higher intensity of penetration into the recording paper. This mixing may be conspicuous. For example, when the dynamic surface tension of the Y ink is unduly lower than that of the Bk ink, the Bk ink causes color mixing in the recorded portion of the Y ink. This bleeding of the Bk ink into the Y ink may be conspicuous and undesirable.

In particular embodiments, the coloring agent of each ink in the water-based ink set may either be a dye or a pigment. Ordinarily, the Bk ink is often used when text data containing characters, marks, lines or the like is printed on the recording paper. In printing text data, prevention of blurring and bleeding is important because this enhances vividness and contrast of an edge portion of the text and visibility of the text. Further, it is also beneficial to enhance the water resistance and light fastness of the ink. To achieve these effects, a pigment is often used as the coloring agent for the Bk ink. On the other hand, the color inks (e.g. the Y ink, the M ink and the C ink) are often used to print images such as graphic data and the like. In order to obtain a vivid color in the color portion of an image, a dye is often used as a coloring agent for these color inks.

Dyes may include water-soluble dyes such as direct dyes, acid dyes, basic dyes and reactive dyes and the like. Among these dyes, those which provide satisfactory levels of vividness, water solubility, stability, and light fastness may include magenta dyes represented by the following general formula (II) or (III) (shown in form of free acid in the general formula (II)); cyan dyes represented by the following general formula (IV) or (V); direct dyes such as C. I. Direct Black 17, 19, 32, 51, 71, 108, 146, 154 and 168, C. I. Direct Blue 6, 22, 25, 71, 86, 90, 106 and 199, C. I. Direct Red 1, 4, 17, 28, 83 and 227, C. I. Direct Yellow 12, 24, 26, 86, 98, 132 and 142, C. I. Direct Orange 34, 39, 44, 46 and 60, C. I. Direct Violet 47 and 48, C. I. Direct Brown 109, C. I. Direct Green 59 and the like; acid dyes such as C. I. Acid Black 2, 7, 24, 26, 31, 52, 63, 112 and 118, C. I. Acid Blue 9, 22, 40, 59, 93, 102, 104, 113, 117, 120, 167, 229 and 234, C. I. Acid Red 1, 6, 32, 37, 51, 52, 80, 85, 87, 92, 94, 115, 181, 256, 289, 315 and 317, C. I. Acid Yellow 11, 17, 23, 25, 29, 42, 61 and 71, C. I. Acid Orange 7 and 19, C. I. Acid Violet 49 and the like; basic dyes such as C. I. Basic Black 2, C. I. Basic Blue 1, 3, 5, 7, 9, 24, 25, 26, 28 and 29, C. I. Basic Red 1, 2, 9, 12, 13, 14 and 37, and C. I. Basic Violet 7, 14 and 27 and the like; reactive dyes such as C. I. Reactive Blue 2, 5, 7, 12, 13, 14, 15, 17, 18, 19, 20, 21, 25, 27, 28, 37, 38, 40, 41, and 71, C. I. Reactive Red 6, 7, 11, 12, 15, 17, 21, 23, 24, 35, 36, 42, 63, 66 and 180, C. I. Reactive Yellow 1, 2, 3, 13, 14, 15 and 17, C. I. Reactive Orange 2, 5, 7, 16, 20 and 24, C. I. Reactive Violet 2, 4, 5, 8 and 9, C. I. Reactive Brown 1, 7 and 16, C. I. Reactive Green 5 and 7 and the like; Food Black 1 and 2; and the like. Each of these dyes may be used either singly or in combinations of two or more to obtain inks having desired colors:

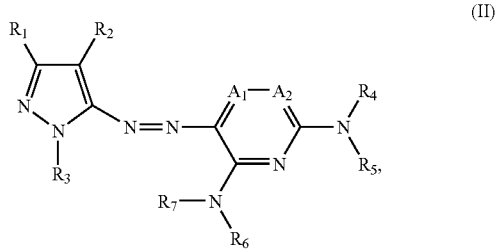

wherein $R_1$ represents a hydrogen atom, an alkyl group which may be substituted or an aryl group which may be substituted;

$R_2$ represents a hydrogen atom, a halogen atom or a cyano group;

$R_3$ represents a hydrogen atom, an alkyl group which may be substituted, an aryl group which may be substituted or a heterocyclic group which may be substituted;

$R_4$, $R_5$, $R_6$ and $R_7$, each independently, represent a hydrogen atom, an alkyl group which may be substituted, an aryl group which may be substituted, a heterocyclic group which may be substituted, a sulfonyl group which may be substituted or an acyl group which may be substituted, in which $R_4$ and $R_5$ do not simultaneously represent a hydrogen atom and $R_6$ and $R_7$ do not simultaneously represent a hydrogen atom;

$A_1$ and $A_2$ each represent a carbon atom which may be substituted, or one of $A_1$ and $A_2$ represents a carbon atom which may be substituted and the other represents a nitrogen atom;

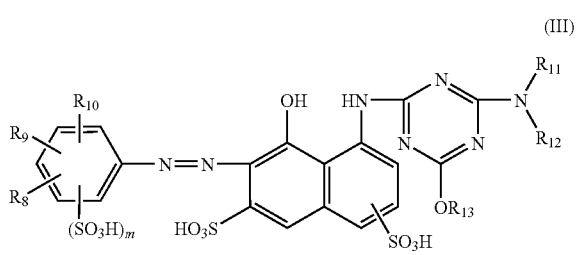

(III)

wherein $R_8$, $R_9$ and $R_{10}$ each independently, represent an alkyl group which may be substituted, an alkoxy group which may be substituted, a halogen atom, a hydrogen atom, a hydroxyl group, a carbamoyl group which may be substituted, a sulfamoyl group which may be substituted, an amino group which may be substituted, a nitro group, a sulfonic acid ester group, an alkylsulfonyl group which may be substituted, an aryl sulfonyl group which may be substituted, a carboxyl group or a carboxylic acid ester group;

m represents the number of 0, 1 or 2; and $R_{11}$, $R_{12}$ and $R_{13}$, each independently, represent a hydrogen atom, an alkyl group which may be substituted, an alkenyl group which may be substituted, an aryl group which may be substituted, an aralkyl group which may be substituted, an alicyclic group which may be substituted or a heterocyclic group which may be substituted;

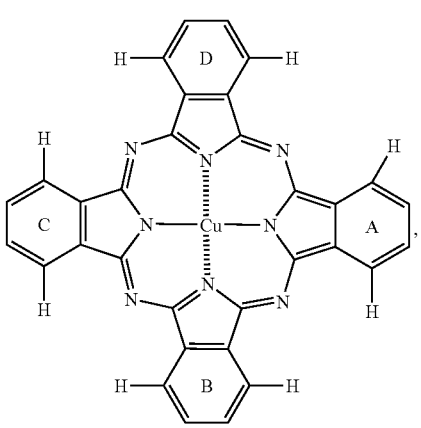

(VI)

wherein, in the general formulae (IV) and (V), Pc (Cu) represents a copper phthalocyanine nucleus represented by the general formula (VI);

in the general formula (IV), $R_{14}$, $R_{15}$, $R_{16}$ and $R_{17}$, each independently, represent a substituent selected from $-SO_2-R_a$, $-SO_2NR_bR_c$ or $-CO_2-R_a$, in which $R_{14}$, $R_{15}$, $R_{16}$ and $R_{17}$ are not same with one another and at least one of $R_{14}$, $R_{15}$, $R_{16}$ and $R_{17}$ contains an ionic hydrophilic group as a substituent;

at least one of $R_{14}$, $R_{15}$, $R_{16}$ and $R_{17}$ present in each of benzene rings A, B, C and D in a copper phthalocyanine nucleus represented by the general formula (VI);

$R_a$ represents a substituted or unsubstituted alkyl group;

$R_b$ represents a hydrogen atom, a substituted or unsubstituted alkyl group;

$R_c$ represents a substituted or unsubstituted alkyl group;

k represents the number satisfying the inequality of: $0<k<8$;

l represents the number satisfying the inequality of: $0<l<8$;

p represents the number satisfying the inequality of: $0 \leq p<8$;

n represents the number satisfying the inequality of: $0 \leq q<8$; and, k, l, p and q each represent the number satisfying the inequality of: $4 \leq k+l+p+q \leq 8$;

in the general formula (V), an $SO_3L$ group and an $SO_2NH_2$ group are present in any one of four benzene rings A, B, C and D in a copper phthalocyanine nucleus represented by the general formula (VI);

L represents a monovalent metallic cation selected from a lithium ion, a sodium ion and a potassium ion;

y represents the number satisfying the inequality of: $0<y<4$;

z represents the number satisfying the inequality of: $0<z<4$; and, y and z each represent the number satisfying the inequality of: $2 \leq y+z \leq 5$.

Pigments used in embodiments of the invention may include carbon black, inorganic pigment and organic pigment. Examples of such pigments include, but are not limited to, azo pigments such as azo lake pigments, insoluble azo pigments, condensed azo pigments, chelate azo pigments and the like; polycyclic pigments such as phthalocyanine pigments, perylene and perynone pigments, anthraquinone pigments, quinacridone pigments, dioxazine pigments, thioindigo pigments, isoindolinone pigments, quinophthalone pigments and the like; dye lake pigments such as basic dye type lake pigments, acidic dye type lake pigments and the like; organic pigments such as nitro pigments, nitroso pigments, aniline black daylight fluorescent pigments and the like; inorganic pigments such as titanium oxide, iron oxide-based pigments and carbon black-based pigments and the like. Further, any other pigment may also be used so long as it may be dispersed in a water phase. Examples of such pigments include, but are not limited to, C. I. Pigment Black 1, 7 and the like; C. I. Pigment Blue 2, 3, 15, 16, 22, 25 and the like; C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 49, 50, 51, 52, 53, 55, 60, 64, 83, 87, 88, 89, 90, 112, 114, 122, 123, 163 and the like; C. I. Pigment Yellow 1, 2, 3, 4, 5, 6, 7, 10, 11, 12, 13, 14, 15, 16, 17, 65, 74 and 83; and the like. These pigments may either be used singly, or in combinations of two or more to obtain inks of desired colors.

Further, a self-dispersion type pigment, for example graft carbon obtained by applying a surface treatment to pigments, for example with a surfactant or a macromolecular dispersing agent, or the like may also be used as the pigment. Commercially available self-dispersion type pigment may be used. For example, carbon black, CAB-O-JET® 200, 250, 260, 300, 700 and the like (product from Cabot Specialty Chemicals, Inc.) and BONJET® BLACK CW-1, CW-2, CW-3 and the like (product from Orient Chemical Industries, Ltd.) may be used.

The amount of the coloring agent (e.g. dye or pigment) in each ink may be about 0.1 wt % to about 20 wt %, more specifically about 0.3 wt % to about 15 wt %, or even more specifically about 0.5 wt % to about 10 wt %, of the overall weight of each ink. When the amount of coloring agent in each ink is less than 0.1 wt %, a sufficient print density on recording paper may not be obtained. On the other hand, when the amount of dye in an ink is more than about 20 wt %, the dye may not fully be dissolved in the ink and may sometimes be deposited. When the amount of pigment in an ink is more than about 20%, it becomes difficult for the pigment to maintain dispersion stability. Therefore it may be undesirable for the ink to contain more than about 20 wt % coloring agent.

Each ink in a water-based ink set contains water. In order to prevent a nozzle or a filter from being clogged with impurities contained in water, high purity water such as deionized water, distilled water or extra-pure water may be used in each ink. The amount of water in each ink may be about 10 wt % to about 98 wt %, specifically about 30 wt % to about 97 wt %, or more specifically about 40 wt % to about 95 wt %, of the overall weight of each ink.

In order to prevent the ink in a printer head nozzle from drying and to enhance liquid stability, each ink of the ink set may also contain a humectant.

Examples of such humectants include, but are not limited to, polyols such as ethylene glycol, propylene glycol, diethylene glycol, triethylene glycol, dipropylene glycol, polyethylene glycol, polypropylene glycol, 1,3-butanediol, 1,5-pentanediol, 1,6-hexanediol, glycerin, 1,2,6-hexanetriol, 1,2,4-butanetriol, 1,2,3-butanetriol and the like; nitrogen-containing heterocyclic compounds such as N-methyl-2-pyrrolidone, N-hydroxyethyl-2-pyrrolidone, 2-pyrrolidone, 1,3-dimethylimidazolidinone, ε-caprolactam and the like; amides such as formamide, N-methylformamide, N,N-dimethylformamide and the like; amines such as ethanol amine, diethanolamine, triethanolamine, ethylamine, diethyl amine, triethyl amine and the like; and sulfur-containing compounds such as dimethylsulfoxide, sulfolane, thiodiethanol and the like. These humectants may either be used singly or in combinations of two or more.

The amount of the humectant in each ink may be determined over a wide range taking into consideration ink compositions and desired ink characteristics. Ordinarily, the amount of humectant in each ink may be 0 wt % to about 40 wt %, or more specifically about 0 wt % to about 30 wt %, of the overall weight of each ink. When the amount of humectant is more than about 40 wt %, the viscosity of the ink becomes too high and it becomes difficult to discharge the ink from the nozzle of the ink-jet head and the ink dries too slowly on the surface of paper, neither of which is desirable.

Further, to control penetrability into the recording paper and drying each ink in the ink set, a monovalent alcohol such as ethanol or isopropyl alcohol and the like may be used.

Each ink may also contain one or more of a dispersing agent, a viscosity modifier, a surfactant, a pH adjuster, an preservative, or a mildewproofing agent. Further, if the ink is used in a thermal-ejection ink-jet system, one or more additives which adjust thermophysical properties such as specific heat, thermal expansion coefficient, or thermal conductivity and the like may be included.

EXAMPLES

The following examples are provided only to illustrate certain embodiments of the description and are not intended to embody the total scope of the invention or any embodiment thereof. Variations of the exemplary embodiments below are intended to be included within the scope of the invention.

Examples 1 to 5 and Comparative Examples 1 to 4

(1) Preparation of Ink and Measurement of Dynamic Surface Tension

Inks used in Examples and Comparative Examples were obtained by thoroughly mixing compositions summarized in Tables 1 to 4.

Further, the dynamic surface tension of each ink was measured by using an automatic dynamic surface tension meter BP-D4 (product from Kyowa Interface Science Co., LTD.) at a measurement temperature of 25° C. under a measuring condition of a lifetime of 20 ms to 5000 ms. Values at lifetimes of 30 ms and 1000 ms are shown in Tables 1 to 4.

TABLE 1

| | | (Bk ink) | | | |
|---|---|---|---|---|---|
| | | Bk-1e | Bk-2e | Bk-3c | Bk-4c |
| CAB-O-JET ® 300*[1] | | 35.0 | 35.0 | — | — |
| C.I.Direct Black 154 | | — | — | 3.0 | 3.0 |
| Glycerin | | 21.5 | 24.0 | 22.0 | 22.0 |
| Dipropylene glycol propyl ether | | 1.0 | 1.0 | 2.5 | — |
| Triethylene glycol butyl ether | | — | — | — | 1.5 |
| SUNNOL ® NL-1430*[2] | | 0.2 | 0.2 | — | 0.1 |
| OLFINE ® E1010*[3] | | 0.1 | 0.2 | 0.5 | — |
| Purified water | | Balance | Balance | Balance | Balance |
| Dynamic surface tension [mN/m] | 30 ms | 43 | 40 | 37 | 47 |
| | 1000 ms | 36 | 35 | 33 | 43 |

*[1] coloring agent solid content is 15%; product from Cabot Specialty Chemicals, Inc.
*[2] in general formula (I), x is 12 and 13; n is 3; M is Na; active ingredient amount is 28 wt %; product from Lion Corporation
*[3] acetylene glycol type surfactant; active ingredient amount is 100 wt %; product from Nissin Chemical Industry Co., Ltd.

TABLE 2

(Y ink)

|  | Y-1e | Y-2e | Y-3e | Y-4c | Y-5c |
|---|---|---|---|---|---|
| C.I.Direct Yellow 86 | — | — | 2.0 | — | — |
| C.I.Direct Yellow 132 | 2.5 | 2.5 | — | 2.5 | 2.5 |
| glycerin | 30.5 | 25.0 | 30.5 | 30.5 | 30.5 |
| Dipropylene glycol propyl ether | — | — | — | — | 1.0 |
| Triethylene glycol butyl ether | 4.0 | 4.5 | 2.0 | 4.5 | — |
| SUNNOL ® NL-1430*[1] | 0.2 | 2.0 | 0.2 | — | 0.1 |
| OLFINE ® E1010*[2] | — | — | — | 1.5 | — |
| Purified water | Balance | Balance | Balance | Balance | Balance |
| Dynamic surface tension [mN/m] 30 ms | 43 | 36 | 47 | 36 | 49 |
| Dynamic surface tension [mN/m] 1000 ms | 38 | 33 | 39 | 33 | 42 |

*[1] in general formula (I), x is 12 and 13; n is 3; M is Na; active ingredient amount is 28 wt %; product from Lion Corporation
*[2] acetylene glycol type surfactant; active ingredient amount is 100 wt %; product from Nissin Chemical Industry Co., Ltd.

TABLE 3

(M ink)

|  | M-1e | M-2e | M-3e | M-4e | M-5c | M-6c |
|---|---|---|---|---|---|---|
| C.I.Direct Red 227 | 3.0 | 3.0 | 3.0 | 3.0 | 3.0 | 3.0 |
| Glycerin | 30.5 | 30.5 | 30.5 | 32.5 | 30.5 | 32.0 |
| Dipropylene glycol propyl ether | — | 1.0 | — | — | — | 1.0 |
| Triethylene glycol butyl ether | 4.0 | 1.5 | 4.5 | 2.0 | 4.5 | — |
| SUNNOL ® NL-1430*[1] | 0.2 | 1.0 | 0.4 | 0.1 | — | 0.1 |
| OLFINE ® E1010*[2] | — | — | — | — | 1.5 | — |
| Purified water | Balance | Balance | Balance | Balance | Balance | Balance |
| Dynamic surface tension [mN/m] 30 ms | 42 | 43 | 40 | 48 | 33 | 50 |
| Dynamic surface tension [mN/m] 1000 ms | 37 | 39 | 34 | 40 | 30 | 43 |

*[1] in general formula (I), x is 12 and 13; n is 3; M is Na; active ingredient amount is 28 wt %; product from Lion Corporation
*[2] acetylene glycol type surfactant; active ingredient amount is 100 wt %; product from Nissin Chemical Industry Co., Ltd.

TABLE 4

(C ink)

|  | C-1e | C-2e | C-3e | C-4c | C-5c |
|---|---|---|---|---|---|
| C.I.Direct Blue 199 | 3.0 | 3.0 | 3.0 | 3.0 | 3.0 |
| glycerin | 30.5 | 30.5 | 35.0 | 30.5 | 36.0 |
| Dipropylene glycol propyl ether | — | — | — | — | 1.0 |
| Triethylene glycol butyl ether | 4.0 | 4.5 | 2.0 | 4.5 | — |
| SUNNOL ® NL-1430*[1] | 0.2 | 0.4 | 0.1 | — | 0.2 |
| OLFINE ® E1010*[2] | — | — | — | 1.5 | — |
| Purified water | Balance | Balance | Balance | Balance | Balance |
| Dynamic surface tension [mN/m] 30 ms | 40 | 40 | 47 | 34 | 48 |
| Dynamic surface tension [mN/m] 1000 ms | 35 | 33 | 40 | 32 | 40 |

*[1] in general formula (I), x is 12 and 13; n is 3; M is Na; active ingredient amount is 28 wt %; product from Lion Corporation
*[2] acetylene glycol type surfactant; active ingredient amount is 100 wt %; product from Nissin Chemical Industry Co., Ltd.

(2) Constitution of Ink Sets

Bk ink, the Y ink, the M ink and the C ink prepared as described above were combined as summarized in Table 5, to thereby constitute respective ink sets of Examples 1 to 5 and Comparative Examples 1 to 4.

(3) Evaluation

Ink cartridges were filled with inks for each ink set of Examples 1 to 5 and Comparative Examples 1 to 4. Then, the filled ink cartridges were attached to a digital multifunction device equipped with a piezoelectric ink-jet printer DCP-110C (product from Brother Industries, Ltd.). The device was used to evaluate, as described below, (a) recovery performance upon ink introduction; (b) Bk ink drying on the surface of paper; (c) blurring of Bk ink; (d) bleeding between the different inks; (e) color unevenness in the color printing region; and (f) overall performance. The results are shown in Table 5.

a) Evaluation of Recovery Performance Upon Ink Introduction

Inks were degassed using a vacuum pump while applying an ultrasonic wave. Then, the cartridges were filled with the inks. These cartridges were used for evaluation. These inks were recorded by using the digital multifunction device equipped with the piezoelectric ink-jet printer DCP-110C (product from Brother Industries, Ltd.). An evaluation of recovery performance upon ink introduction into an ink-jet head after previous ejection failure from a nozzle was performed. To perform this evaluation, three purges (suction of the ink with a pump provided in a printer body) were performed after the ink cartridges were changed in the device. Then, discharge ability of all nozzles was evaluated in accordance with the following evaluation criteria.

Evaluation Criteria of Recovery Performance Upon Ink Introduction

A: inks are dischargeable from all nozzles after three purges

C: inks are not dischargeable from some of nozzles after three purges (b) Evaluation of Bk Ink Drying on the Surface of Paper For evaluation, a character in black was printed without any background on regular high quality paper BP60PA (product from Brother Industries, Ltd.). After standing for 15 seconds, the evaluation character was rubbed with a finger and the extent to which ink rubbed-off was visually observed by a person with normal vision and evaluated in accordance with the following evaluation criteria.

Evaluation Criteria of Bk Ink Drying on Surface of Paper after Printing

A: rubbing-off of ink is hardly noticeable

C: rubbing-off of ink is conspicuous and may present a problem for a practical use (c) Evaluation of Blurring of Bk Ink For evaluation, a character in black was printed without any background. Blurring of the Bk ink as observed through disturbance of a line and readability of the character were evaluated by a person with normal vision in accordance with the following evaluation criteria. Forth is evaluation, the character was set to have a font size 11 and the recording was performed on regular high quality paper BP60PA (product from Brother Industries, Ltd.).

Evaluation Criteria for Blurring of Bk Ink
A: blurring is hardly noticeable and character is vivid
C: blurring is clearly present (d) Evaluation of Bleeding Between Different Inks For evaluation, an image was printed in which black, yellow, magenta and cyan are combined with one another to form a character printed in one ink and a background printed in a different ink. For comparison, characters in black, yellow, magenta and cyan without any background were also printed. For this evaluation, each character was set to have a font size 11 and the recording was performed on regular high quality paper of BP60PA (product from Brother Industries, Ltd.). For this evaluation, the character printed with the background was visually compared by a person with normal vision with the character without the background. The extent of bleeding at the interface of inks and readability of the character were evaluated in accordance with the following evaluation criteria:

Evaluation Criteria for Bleeding Between Different Inks
A: in each combination of inks, there is slight bleeding in the character printed with a background as compared to the character without the background, but characters are sufficiently readable
C: in at least one combination of inks, bleeding in the character printed with a background clearly occurs as compared to the character without the background and the character is hardly readable.

(e) Evaluation of Color Unevenness in Color Printing Region

For evaluation, a pattern was printed having a portion of each single color and a portion for each possible mixture of two colors. Mixed colors were printed in a ratio of 1:1 based on volume of ink deposited per unit area on the paper. The mixed color portion had a size of 3 cm length by 3 cm width, was printed on regular high quality paper BP60PA (product from Brother Industries, Ltd.). In all patterns, the printed portion was visually observed by a person with normal vision from a distance of about 30 cm. Color unevenness was evaluated in accordance with the following evaluation criteria:

Evaluation Criteria for Color Unevenness in the Color Printing Region
A: color unevenness in a color printing region (single color portion or mixed color portion) is hardly conspicuous
C: color unevenness in a color printing region (single color portion or mixed color portion) is clearly generated (f) Overall Evaluation.

An overall evaluation was performed in accordance with the following criteria:

G: each of the recovery performance upon ink introduction, Bk ink drying on the surface of paper, blurring of Bk ink, bleeding, and color unevenness in a color printing region are evaluated as being "A"

NG: any one of the recovery performance upon ink introduction, Bk ink drying on the surface of paper, blurring of Bk ink, bleeding, and color unevenness in a color printing region is evaluated as being "C".

TABLE 5

|  |  | Example | | | | | Comparative Example | | | |
| --- | --- | --- | --- | --- | --- | --- | --- | --- | --- | --- |
|  |  | 1 | 2 | 3 | 4 | 5 | 1 | 2 | 3 | 4 |
| Black ink |  | Bk-1e | Bk-1e | Bk-2e | Bk-1e | Bk-1e | Bk-3c | Bk-1e | Bk-4c | Bk-2e |
|  | 30 ms*[1] | 43 | 43 | 40 | 43 | 43 | 37 | 43 | 47 | 40 |
|  | 1000 ms*[2] | 36 | 36 | 35 | 36 | 36 | 33 | 36 | 43 | 35 |
| Yellow ink |  | Y-1e | Y-1e | Y-2e | Y-1e | Y-3e | Y-4c | Y-4c | Y-1e | Y-5c |
|  | 30 ms*[1] | 43 | 43 | 36 | 43 | 47 | 36 | 36 | 43 | 49 |
|  | 1000 ms*[2] | 38 | 38 | 33 | 33 | 39 | 33 | 33 | 38 | 42 |
| Magenta ink |  | M-2e | M-1e | M-3e | M-4e | M-4e | M-5c | M-5c | M-2e | M-6c |
|  | 30 ms*[1] | 43 | 42 | 40 | 48 | 48 | 33 | 33 | 43 | 50 |
|  | 1000 ms*[2] | 39 | 37 | 34 | 40 | 40 | 30 | 30 | 39 | 43 |
| Cyan ink |  | C-1e | C-1e | C-2e | C-3e | C-3e | C-4c | C-4c | C-1e | C-5c |
|  | 30 ms*[1] | 40 | 40 | 40 | 47 | 47 | 34 | 34 | 40 | 48 |
|  | 1000 ms*[2] | 35 | 35 | 33 | 40 | 40 | 32 | 32 | 35 | 40 |
| Dynamic surface | 30 ms*[3] | 3 | 3 | 4 | 5 | 5 | 4 | 10 | 7 | 10 |
| tension, maximum | 1000 ms*[3] | 4 | 3 | 2 | 4 | 4 | 3 | 6 | 8 | 8 |
| difference |  |  |  |  |  |  |  |  |  |  |
| Recovery performance upon ink introduction |  | A | A | A | A | A | C | C | A | A |
| Drying property on surface of paper (black character) |  | A | A | A | A | A | A | A | C | A |
| Blurring (black character) |  | A | A | A | A | A | C | A | A | A |
| Bleeding |  | A | A | A | A | A | A | C | C | C |
| Color unevenness (color printing portion) |  | A | A | A | A | A | A | A | A | C |
| Overall evaluation |  | G | G | G | G | G | NG | NG | NG | NG |

*[1]dynamic surface tension at a lifetime of 30 ms, unit: [mN/m]
*[2]dynamic surface tension at a lifetime of 1000 ms, unit: [mN/m]
*[3]maximum difference between dynamic surface tensions at a lifetime of 30 ms and 1000 ms, unit: [mN/m]

Inks in the ink sets of Examples 1 to 5 each contained a surfactant represented by the general formula (I). These inks all exhibited excellent recovery performance upon ink introduction as a result. Further, because the Bk ink contained dipropylene glycol propyl ether and the dynamic surface tension thereof was 45 mN/m or less at a lifetime of 30 ms, the Bk ink exhibited excellent drying on the surface of paper. Finally, because the dynamic surface tension thereof was 35 mN/m or more at a lifetime of 1000 ms, blurring of a printed character was hardly evident. In short, the test results relating to Bk ink for Examples 1 to 5 were all favorable.

The Y ink, the M ink and the C ink (generically called "color inks") each contained triethylene glycol butyl ether, resulting in no color unevenness in the color printing portion. Thus, the test results relating to Bk ink for Examples 1 to 5 were favorable.

Finally, among all four colors in each ink set of Examples 1 to 5, the difference in dynamic surface tension between the ink having the maximum values of the dynamic surface tensions at lifetimes of 30 ms and 1000 ms and the ink having the minimum values of the dynamic surface tensions at lifetimes of 30 ms and 1000 ms was 5 mN/m or less. As a result, there was a satisfactorily low amount of bleeding between different inks.

In comparison, none of the inks in the ink set of Comparative Example 1 contained the surfactant represented by the general formula (I). As a result this ink set had a problem in the recovery performance upon ink introduction. Further, because the dynamic surface tension of the Bk ink was less than 35 mN/m at a lifetime of 1000 ms, there was a problem with blurring of the Bk ink.

The color inks in the ink set of Comparative Example 2 did not contain the surfactant represented by the general formula (I), resulting in a problem in the recovery performance upon ink introduction. Further, the difference between the dynamic surface tensions of the inks which exhibited the maximum value and the minimum values, respectively, of the dynamic surface tensions at lifetimes of 30 ms and 1000 ms was over 5 mN/m. As a result, there was a problem with bleeding.

The Bk ink in the ink set of Comparative Example 3 did not contain dipropylene glycol propyl ether and the dynamic surface tension thereof was over 45 mN/m at a lifetime of 30 ms, so it did not dry appropriately on the surface of paper. Further, the difference between the dynamic surface tensions of the inks which exhibited the maximum value and the minimum values, respectively, of the dynamic surface tensions at lifetimes of 30 ms and 1000 ms was over 5 mN/m. As a result, there was a problem with bleeding.

The color inks in the ink set of Comparative Example 4 did not contain triethylene glycol butyl ether causing color unevenness in the color portion of a printed image. Further, the difference in the dynamic surface tensions between the inks which exhibited the maximum value and the minimum values, respectively, of the dynamic surface tensions at lifetimes of 30 ms and 1000 ms was over 5 mN/m. As a result, there was a problem in bleeding.

Although embodiments of the present invention have been described in detail herein, the scope of the invention is not limited thereto. It will be appreciated by those of ordinary skill in the relevant art that various modifications may be made without departing from the scope of the invention. Accordingly, the embodiments disclosed herein are exemplary. It is to be understood that the scope of the invention is not to be limited thereby, but is to be determined by the claims which follow.

What is claimed is:

1. A water-based ink set comprising a black ink, a yellow ink, a magenta ink and a cyan ink,
wherein each of the black ink, the yellow ink, the magenta ink and the cyan ink comprises a polyoxyethylene alkyl ether sulfonate represented by the following general formula (I):

$$R-O-(CH_2CH_2O)_n-SO_3M \quad (I),$$

wherein R represents $C_xH_{2x+1}$ in which x represents a number from 11 to 15;
M represents Na, $NH_4$ or $NH(CH_2CH_2OH)_3$; and
n represents a number from 2 to 4,
wherein the black ink comprises dipropylene glycol propyl ether,
wherein each of the yellow ink, the magenta ink and the cyan ink comprises triethylene glycol butyl ether,
wherein a dynamic surface tension of the black ink as measured by a maximum bubble pressure method at a measurement temperature of 25° C. is about 35 mN/m or more at a lifetime of 1000 ms and about 45 mN/m or less at a lifetime of 30 ms, and
wherein an absolute value of a difference between dynamic surface tensions of each combination of inks selected from the black ink, the yellow ink, the magenta ink and the cyan ink is about 5 mN/m or less at the lifetimes of 30 ms and 1000 ms.

2. The water-based ink set according to claim 1, wherein, in the general formula (I),
M represents Na;
x represents 12 or 13; and
n represents 3.

3. The water-based ink set according to claim 1, wherein an amount of the polyoxyethylene alkyl ether sulfonate in each of the black ink, the yellow ink, the magenta ink and the cyan ink is about 0.01 wt % to about 1 wt % of the overall weight of each ink.

4. The water-based ink set according to claim 1, wherein an amount of the dipropylene glycol propyl ether in the black ink is about 0.1 wt % to about 3 wt % of the overall weight of the black ink.

5. The water-based ink set according to claim 1, wherein an amount of the triethylene glycol butyl ether in each of the yellow ink, the magenta ink and the cyan ink is about 0.5 wt % to about 10 wt % of the overall weight of each ink.

6. The water-based ink set according to claim 1, wherein the absolute value of a difference between dynamic surface tensions of each combination of inks selected from the black ink, the yellow ink, the magenta ink and the cyan ink is about 5 mN/m or less at any same lifetime between 30 ms and 1000 ms.

7. The water-based ink set according to claim 1, wherein the ink set exhibits a recovery performance upon ink introduction such that after change of a cartridge containing the any ink of the ink set in a device comprising an ink-jet head comprising at least one nozzle, the ink in the ink-jet head is dischargeable from all nozzles after three purges of the ink-jet head.

8. The water-based ink set according to claim 1, wherein the black ink dries on the surface of paper after printing such that it does not noticeably rub off when rubbed with a finger.

9. The water-based ink set according to claim 1, wherein blurring of the black ink is hardly noticeable after printing a character and the character is vivid.

10. The water-based ink set according to claim 1, wherein, with respect to each possible combination of any two yellow, cyan, magenta or black inks, after printing a character in a first ink on a background of a second ink and separately printing the character in the first ink with no background, there is no more than slight bleeding in the character printed on the background as compared to the character with no background, and the characters are both readable.

11. The water-based ink set according to claim 1, wherein color unevenness in a color region of an image printed using the ink set is hardly conspicuous.

12. A water-based ink set comprising a black ink, a yellow ink, a magenta ink and a cyan ink,
wherein each of the black ink, the yellow ink, the magenta ink and the cyan ink comprises a polyoxyethylene alkyl ether sulfonate represented by the following general formula (I):

wherein R represents $C_xH_{2x+1}$ in which x represents a number from 11 to 15;
M represents Na, $NH_4$ or $NH(CH_2CH_2OH)_3$; and
n represents a number from 2 to 4,
wherein a dynamic surface tension of the black ink as measured by a maximum bubble pressure method at a measurement temperature of 25° C. is about 35 mN/m or more at a lifetime of 1000 ms and about 45 mN/m or less at a lifetime of 30 ms, and
wherein an absolute value of a difference between dynamic surface tensions of each combination of inks selected from the black ink, the yellow ink, the magenta ink and the cyan ink is about 5 mN/m or less at the lifetimes of 30 ms and 1000 ms.

13. The water-based ink set according to claim 12, wherein, in the general formula (I),
M represents Na;
x represents 12 or 13; and
n represents 3.

14. The water-based ink set according to claim 12, wherein an amount of the polyoxyethylene alkyl ether sulfonate in each of the black ink, the yellow ink, the magenta ink and the cyan ink is about 0.01 wt % to about 1 wt % of the overall weight of each ink.

15. The water-based ink set according to claim 12, wherein the absolute value of a difference between dynamic surface tensions of each combination of inks selected from the black ink, the yellow ink, the magenta ink and the cyan ink is about 5 mN/m or less at any same lifetime between 30 ms and 1000 ms.

16. A water-based ink set comprising a black ink, a yellow ink, a magenta ink and a cyan ink,
wherein each of the black ink, the yellow ink, the magenta ink and the cyan ink comprises a polyoxyethylene alkyl ether sulfonate represented by the following general formula (I):

wherein R represents $C_xH_{2x+1}$ in which x represents a number from 11 to 15;
M represents Na, $NH_4$ or $NH(CH_2CH_2OH)_3$; and
n represents a number from 2 to 4,
wherein the black ink comprises a coloring agent and dipropylene glycol propyl ether, and
wherein each of the yellow ink, the magenta ink and the cyan ink comprises a coloring agent and triethylene glycol butyl ether.

17. The water-based ink set according to claim 16, wherein, in the general formula (I),
M represents Na;
x represents 12 or 13; and
n represents 3.

18. The water-based ink set according to claim 16, wherein an amount of the polyoxyethylene alkyl ether sulfonate in each of the black ink, the yellow ink, the magenta ink and the cyan ink is about 0.01 wt % to about 1 wt % of the overall weight of each ink.

19. The water-based ink set according to claim 16, wherein an amount of the dipropylene glycol propyl ether in the black ink is about 0.1 wt % to about 3 wt % of the overall weight of the black ink.

20. The water-based ink set according to claim 16, wherein an amount of the triethylene glycol butyl ether in each of the yellow ink, the magenta ink and the cyan ink is about 0.5 wt % to about 10 wt % of the overall weight of each ink.

* * * * *